United States Patent
Hassett et al.

(10) Patent No.: US 11,547,223 B1
(45) Date of Patent: Jan. 10, 2023

(54) APPARATUS AND METHODS FOR HANGING OBJECTS ON A VERTICAL SURFACE

(71) Applicant: H-Ventures, LLC, Marblehead, MA (US)

(72) Inventors: John Hassett, Marblehead, MA (US); Susan Hassett, Marblehead, MA (US); Lucas Hassett, Marblehead, MA (US); Chris Hassett, Marblehead, MA (US); Ryan Fuentes, Marblehead, MA (US)

(73) Assignee: H-Ventures, LLC, Marblehead, MA (US)

( * ) Notice: Subject to any disclaimer, the term of this patent is extended or adjusted under 35 U.S.C. 154(b) by 0 days.

(21) Appl. No.: 17/088,972

(22) Filed: Nov. 4, 2020

Related U.S. Application Data

(60) Provisional application No. 62/973,981, filed on Nov. 4, 2019.

(51) Int. Cl.
*A47G 1/20* (2006.01)
*G01C 9/28* (2006.01)
(Continued)

(52) U.S. Cl.
CPC .............. *A47G 1/205* (2013.01); *A47G 1/17* (2013.01); *G01C 9/28* (2013.01); *G01C 9/34* (2013.01)

(58) Field of Classification Search
CPC . A47G 1/205; A47G 1/17; G01C 9/28; G01C 9/34
See application file for complete search history.

(56) References Cited

U.S. PATENT DOCUMENTS 3,294,356 A 12/1966 Sherman
3,360,229 A 12/1967 Beyer
(Continued)

FOREIGN PATENT DOCUMENTS

CA 2787792 A1 * 3/2013 ............ B25B 11/00
CN 209574151 U 11/2019
(Continued)

OTHER PUBLICATIONS

Go Hang It! Pro, picture hanging and leveling kit sold on amazon.com dated Jun. 30, 2019, weblink: https://www.amazon.com/Go-Hang-Pro-All-One/dp/B07TQKT16K (Year: 2019).*
(Continued)

*Primary Examiner* — Terrell L McKinnon
*Assistant Examiner* — Ding Y Tan
(74) *Attorney, Agent, or Firm* — Sunstein LLP

(57) ABSTRACT

A hanger for hanging an object on a vertical surface includes a plate with a front face and a back face. The back face is to abut a vertical surface onto which the object is to be hung. The hanger includes a first hook and a second hook protruding outward from the front face and an integrated bubble level fixably coupled to the front face and calibrated to indicate a horizontal orientation of the first hook relative to the second hook. A plurality of wall contacts protrudes outward from the front face. Each wall contact includes an opening through which an attachment mechanism traverses to attach the plate to the vertical surface. The hanger does not require the object to have a specifically shaped counterpart in order to interface with the hanger. The hanger removes the need for elaborate and/or time-consuming measuring, thus saving the user time and frustration.

12 Claims, 2 Drawing Sheets

(51) Int. Cl.
   *G01C 9/34* (2006.01)
   *A47G 1/17* (2006.01)

(56) References Cited

U.S. PATENT DOCUMENTS

| | | | | |
|---|---|---|---|---|
| 4,241,510 | A * | 12/1980 | Radecki | G01B 3/02 |
| | | | | 33/474 |
| 5,103,573 | A * | 4/1992 | Ehling | G01C 9/34 |
| | | | | 33/379 |
| 5,209,449 | A | 5/1993 | Hart | |
| 5,454,542 | A | 10/1995 | Hart | |
| 5,848,489 | A | 12/1998 | Hartley et al. | |
| 6,629,680 | B2 * | 10/2003 | Week | A47G 1/20 |
| | | | | 248/176.1 |
| 6,719,260 | B1 | 4/2004 | Hart | |
| 6,978,551 | B2 | 12/2005 | Krake et al. | |
| 7,155,840 | B1 * | 1/2007 | Carbonaro | A47G 1/205 |
| | | | | 33/451 |
| 7,708,252 | B2 | 5/2010 | Berg et al. | |
| 7,797,853 | B2 * | 9/2010 | Compton | A47G 1/205 |
| | | | | 33/666 |
| 7,856,732 | B2 | 12/2010 | Townsend et al. | |
| 9,733,077 | B2 | 8/2017 | Swisher et al. | |
| 9,987,742 | B1 | 6/2018 | Mason et al. | |
| 10,047,903 | B2 | 8/2018 | Bruno | |
| 10,194,760 | B2 * | 2/2019 | Frazier, Jr. | A47G 1/205 |
| 2002/0066199 | A1 * | 6/2002 | Hanson | G01C 9/28 |
| | | | | 33/613 |
| 2004/0084598 | A1 * | 5/2004 | Dodig, Jr. | A47G 1/20 |
| | | | | 248/475.1 |
| 2005/0178942 | A1 * | 8/2005 | Dodig | A47G 1/20 |
| | | | | 248/475.1 |
| 2006/0054771 | A1 | 3/2006 | Lie | |
| 2006/0226318 | A1 * | 10/2006 | D'Amico | B25B 11/002 |
| | | | | 248/274.1 |
| 2007/0075211 | A1 * | 4/2007 | Potter | A47G 1/202 |
| | | | | 248/476 |
| 2009/0261227 | A1 * | 10/2009 | Venderley | A47G 1/205 |
| | | | | 248/488 |
| 2009/0294610 | A1 * | 12/2009 | Paharik | A47G 1/205 |
| | | | | 248/220.21 |
| 2010/0193658 | A1 * | 8/2010 | Beger | F16M 13/02 |
| | | | | 248/542 |
| 2013/0283625 | A1 | 10/2013 | Sullivan | |
| 2015/0354230 | A1 * | 12/2015 | Houser | G01C 9/34 |
| | | | | 33/379 |
| 2016/0198871 | A1 | 7/2016 | Hansen | |
| 2016/0325421 | A1 * | 11/2016 | Bruno | F16M 13/02 |
| 2017/0150834 | A1 * | 6/2017 | Sergyeyenko | B25H 7/04 |
| 2018/0245735 | A1 * | 8/2018 | Forrest | A47G 1/17 |
| 2020/0196779 | A1 * | 6/2020 | Black | A47G 1/22 |
| 2020/0345158 | A1 * | 11/2020 | Hammond | G01C 9/28 |

FOREIGN PATENT DOCUMENTS

| | | | | |
|---|---|---|---|---|
| GB | 2419409 A | * | 4/2006 | E04G 5/00 |
| GB | 2560166 A | * | 9/2018 | B25B 23/005 |

OTHER PUBLICATIONS

Black and Decker MarkIT Picture Hanging Kit sold on amazon.com, date first available: Nov. 1, 2016, weblink: https://www.amazon.com/Decker-BDMKIT101 C-MarkIT-Picture-Hanging/dp/B01M5IX3L1/ref=cm_cr_arp_d_product_top?ie=UTF8&th=1 (Year: 2016).*

Under the Roof Decorating 6-100101 hanging and level tool sold on amazon.com, date first available: Oct. 20, 2008, weblink: https://www.amazon.com/Under-Roof-Decorating-6-100101-Picture/dp/B0011ULRHQ (Year: 2008).*

VCG construction "How to Hang a Picture Using Hang & Level" on YouTube.com. dated: Jan. 31, 2018 (Year: 2018).*

English Machine Translation of CN209574151U (Year: 2020).

* cited by examiner (Front)

(side)

(back)

US 11,547,223 B1

APPARATUS AND METHODS FOR HANGING OBJECTS ON A VERTICAL SURFACE

BACKGROUND OF THE INVENTION

The hanging of objects onto a vertical surface is often accomplished with a simple apparatus such as a nail, screw or other protrusion extending from the vertical surface upon which the object is hung using an attachment means affixed to the object. The object in this simple method is hung using only a single nail, screw, or other protrusion and is therefore subject to limitations with respect to size and weight and is also subject to periodic realignment due to a gimbal effect. Innumerable variants of this simple method strive to improve on this approach but have failed to address the fundamental requirements of simplicity and effectiveness and either fail to work without specialized custom fittings attached to the object for interface to the hanging apparatus or for additional support, or to permanently affix the object to a fixed level such that it cannot conform optically to its surroundings.

In a modern variant to the simple method above, a single wall-mounted hook used to hang the object on the vertical surface has multiple nails securing it to the surface, seeking to address the need for greater strength and adherence to the vertical surface.

In another variant to this simple approach, particularly for large or heavy objects, two attachment means are affixed to the frame; one on either side of the object to be hung. This approach also requires that two hanging apparatus (nail, screw, etc.) be affixed to the vertical surface on a completely level plane, thereby requiring precise measurement from the floor or ceiling or a separate leveling apparatus and precise placement of both hanging apparatus on the frame.

In one existing approach, a frame hanging apparatus attaches to a universal c-shaped cross section which opens outwardly to the rear of the frame, with a removable spirit level and/or alignment marks to facilitate a permanent level-orientation against the vertical surface. This type of apparatus requires strict alignment between two otherwise separate components; one attached to the object to be hung and the other on the vertical surface. This approach is known in the art as a French Cleat. The variant assumes a shape and dimensions conforming to the back-side of the universal assembly channels found in the typical modern metal picture frame or difficult alignment of the object to be drilled into a wood frame.

In another existing approach, a customized part is to be attached to the frame if the backside does not conform to the universal assembly channels found in the typical modern metal frame. The attachment to the frame is exclusively the top horizontal rail of such fame, thereby exerting all downward force upon the upper rail of the frame, practically requiring additional support from customized objects attached elsewhere on the frame, typically in support of the bottom rail.

In yet another existing approach, multipart apparatus requires a variety of customized additional parts to be affixed to a frame in order to make the frame or other object compatible with the apparatus attached to the wall. The frame or other object is permanently oriented to a level position on the wall by way of the uniquely shaped and compatible two parts to the apparatus.

These existing approaches are difficult to use or level, lack flexibility with respect to size and weight, rely on single-hook solutions, or are cumbersome and costly. There exists a need for an improved apparatus and method for hanging an object on a vertical surface that are easy to use or level, do not require multiple parts, and do not require special affixations to the object.

BRIEF SUMMARY OF THE INVENTION

Disclosed herein is an improved apparatus and method for hanging objects on a vertical surface. Embodiments of the present invention are given in the dependent claims. Embodiments of the present invention can be freely combined with each other if they are not mutually exclusive.

According to one embodiment of the present invention, a hanger for hanging an object on a vertical surface includes a plate with a front face and a back face. The back face is to abut a vertical surface onto which the object is to be hung. The hanger includes a first hook and a second hook protruding outward from the front face and an integrated bubble level fixably coupled to the front face and calibrated to indicate a horizontal orientation of the first hook relative to the second hook. A plurality of wall contacts protrudes outward from the front face. Each wall contact includes an opening through which an attachment mechanism traverses to attach the plate to the vertical surface.

In one aspect of the invention, the plurality of wall contacts includes a first set of wall contacts residing between a first side edge of the plate and a first hook and a second set of wall contacts residing between a second side edge of the plate opposite the first side edge and the second hook. Each of the plurality of wall contacts includes an angled outer surface and a hole in the angled outer surface.

In one aspect of the invention, the hanger further includes a marking hole traversing from the front face and the back face of the plate, positioned between a first side edge of the plate and a second side edge of the plate opposite the first side edge, and offset from a top edge of the plate.

In one aspect of the invention, the hanger further includes an opening in the plate, where the bubble level resides within the opening and is fixably coupled to the front face.

The hanger does not require the object to have a specifically shaped counterpart in order to interface with the hanger. The hanger removes the need for elaborate and/or time-consuming measuring or additional parts, thus saving the user time and frustration, while providing resistance to gimbaling and significantly improved capacity for size and weight.

DETAILED DESCRIPTION OF THE INVENTION

The following description is presented to enable one of ordinary skill in the art to make and use the present invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

Reference in this specification to "one embodiment", "an embodiment", "an exemplary embodiment", or "a preferred embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments. In general, features described in one embodiment might be suitable for use in other embodiments as would be apparent to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Figure 1:
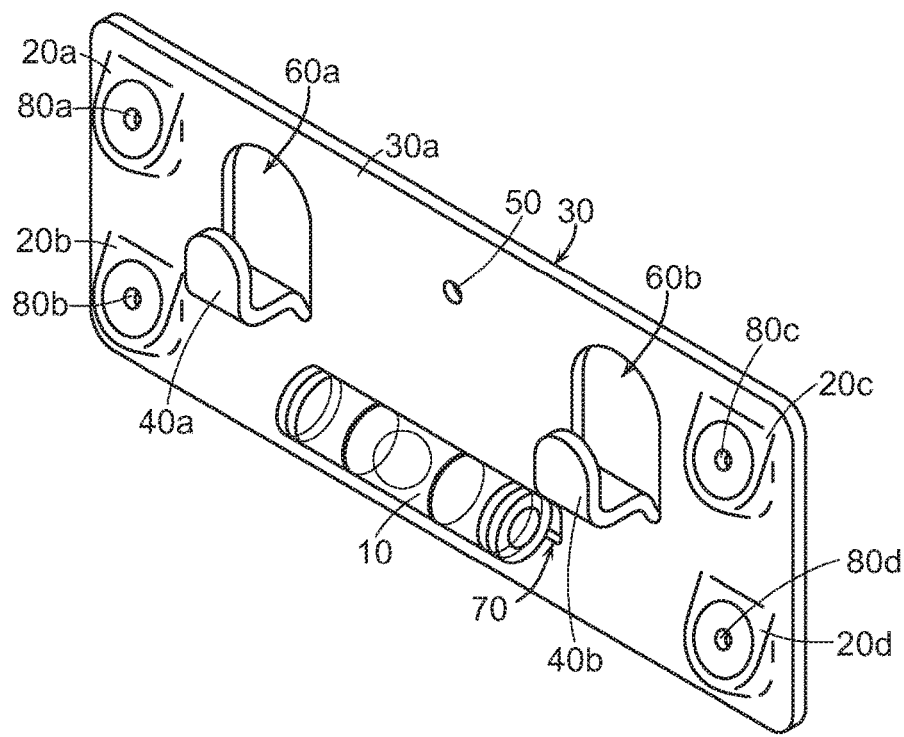
FIG. 1 illustrates a perspective view of the hanger according to embodiments of the present invention.
Figure 2:
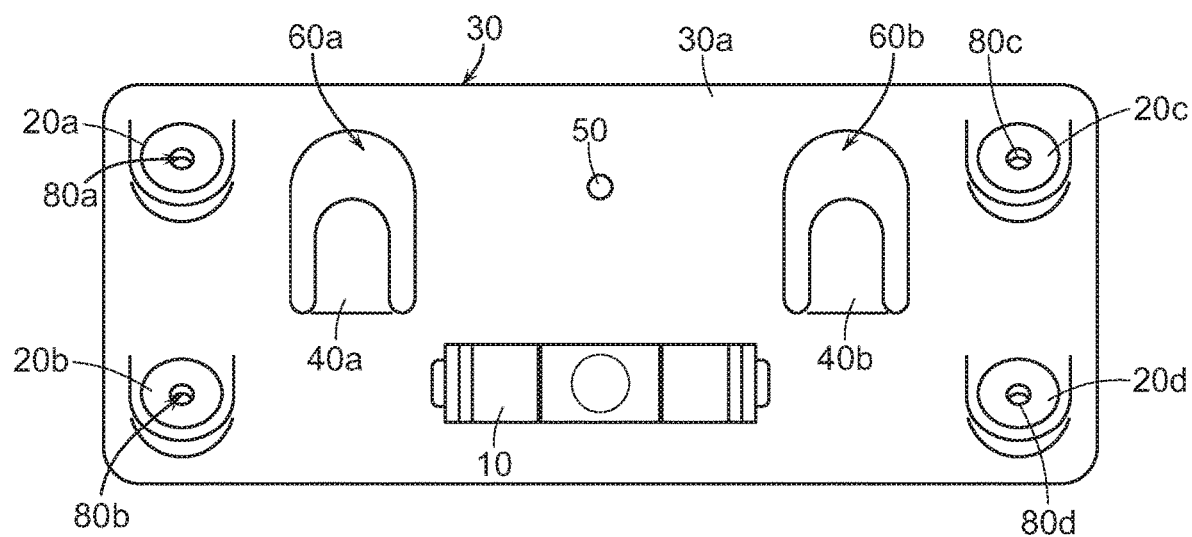
FIG. 2 illustrates a front view of the hanger according to embodiments of the present invention.
Figure 3:
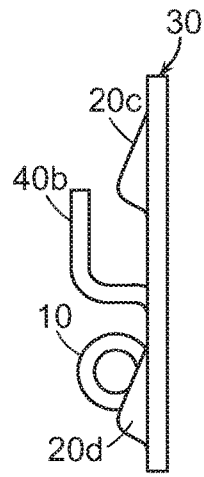
FIG. 3 illustrates a side view of the hanger according to embodiments of the present invention.
Figure 4:
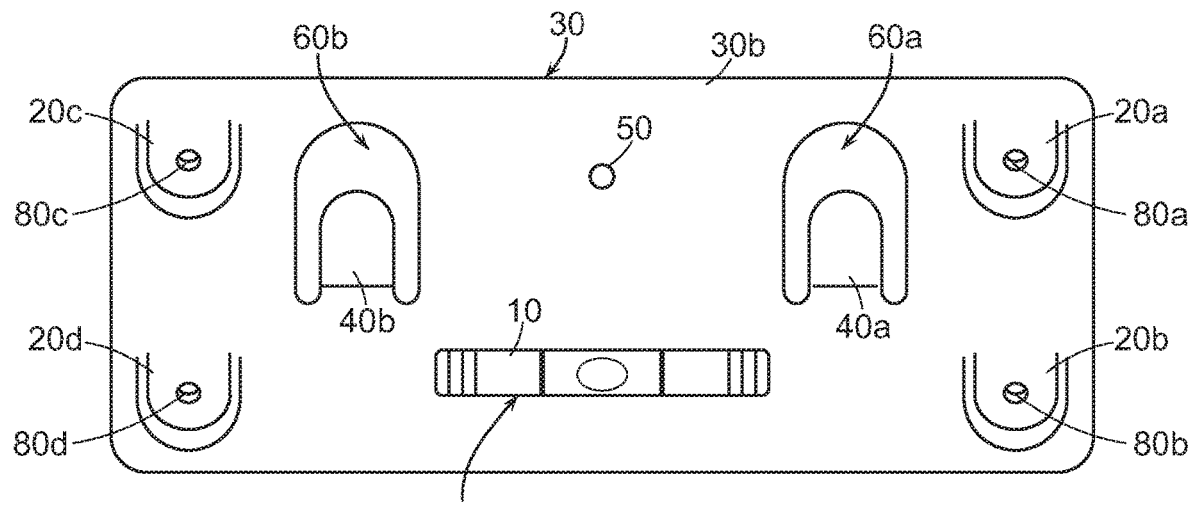
FIG. 4 illustrates a back view of the hanger according to embodiments of the present invention.

FIG. 1 illustrates a perspective view of the hanger according to embodiments of the present invention. FIG. 2 illustrates a front view of the hanger according to embodiments of the present invention. FIG. 3 illustrates a side view of the hanger according to embodiments of the present invention. FIG. 4 illustrates a back view of the hanger according to embodiments of the present invention.

Referring to FIGS. 1-4, the embodiments of the hanger provides an apparatus for hanging an object on a vertical surface, such as a wall. The hanger includes a plate 30, which may be a molded, milled, or stamped part made of metal, such as aluminum. In the illustrated exemplary embodiment, the plate 30 is of a rectangular shape with a width and height based on a size and weight of the object to be hung. More specifically, the distance between the first hook and the second hook on the hanger plate reflects the size and weight characteristics of the object to be hung. The plate 30 has a front side or face 30a, which faces outward and away from the vertical surface when in use as described herein. The plate further has a back side 30b, opposite the front side 30a, which faces towards and abuts the vertical surface when in use as described herein.

The hanger includes two protrusions 40a-40b that project outward from the front face of the plate 30. The plate 30 is cut or stamped to release two pieces of material from the plate 30, except for portions which remains attached to the plate 30. The cut pieces of material are then each manipulated into a hook shape which protrudes outward from the front face 30a of the plate 30. In the illustrated exemplary embodiment, two U-shaped cuts are made in the plate 30, creating two "tongues". Each tongue is bent outward and away from the front face 30a of the plate 30. The end of each tongue is bent upwards, forming hooks 40a-40b. The portion of each hook 40a-40b between the plate 30 and the upwardly bent end is capable of engaging a wire of other hanging mechanism coupled to the object to be hung. Two openings 60a-60b in the plate 30 result from the cutting of the plate material and reside proximate to the hooks 40a-40b. Alternatively, a method other than stamping, such as molding, may be used to form the hooks 40a-40b.

The hanger further includes an integrated bubble level 10, or spirit level. The bubble level 10 includes a vial incompletely filled with a liquid, leaving a bubble in the vial. The bubble level 10 is calibrated so that when the bubble resides between two vertical lines marked on the circumference of the vial, the surface on which the bubble-level 10 resides is level. In the illustrated exemplary embodiment, the bubble level 10 is fixably coupled to the front side 30a of the plate 30, such as through the use of an adhesive compound or pre-formed aperture. The bubble level 10 is positioned on the front side 30a of the plate 30 so that bubble indicates the horizontal orientation of the hooks 40a-40b relative to each other. When the bubble in the bubble level 10 resides between the two vertical lines, the hooks 40a-40b are horizontally level with each other. Although the hanger is illustrated with a tubular shaped bubble level 10, other shapes of the bubble level may be used.

Optionally, an opening 70 may be created in the plate 30 to accommodate the bubble level 10. The opening 70 is shaped for the entire length of the bubble level 10 to reside within the opening 70. The edges of the opening 70 may be beveled to accommodate the tubular shape of the bubble level 10 and to provide more surface area onto which the bubble level 10 may adhere, providing a more secure attachment of the bubble level 10 to the plate 30.

The hanger further includes two sets of wall contacts 20a-20d. The two sets of wall contacts are stamped from the plate 30 to protrude outward from the front side 30a of the plate 30. A first set of wall contacts includes a first top wall contact 20a and a first bottom wall contact 20b. The first set of wall contacts 20a-20b reside between a left or first side edge of the plate 30 and the first hook 40a. A second set of wall contacts includes a second top wall contact 20c and a second bottom wall contact 20d. The second set of wall contacts 20c-20d reside between a right or second side edge of the plate 30, opposite the left or first side edge, and the second hook 40b. The top wall contacts 20a and 20c reside proximate to a top edge of the plate 30. The bottom wall contacts 20b and 20d reside proximate to a bottom edge of the plate 30 opposite the top edge. In the illustrated exemplary embodiment, one wall contact 20a-20d reside proximate to each corner of the rectangular plate 30. The outer surface of each wall contact 20a-20d is angled to face upward when the plate 30 abuts the vertical surface onto which the object is to be hung. In an exemplary embodiment, the angle of the outer surface of the wall contacts 20a-20d is approximately 45 degrees from the front surface 30a of the plate 30. Each wall contact 20a-20d includes an opening 80a-80d in the outer surface and through which an attachment mechanism, such as a pin, nail, or screw, may traverse to attach the plate 30 to the vertical surface. The attachment mechanism, guided by the angle of the outer surfaces of the wall contacts 20a-20d, attaches to the vertical surface at the angle, allowing the hanger to support a greater weight than if the attachment mechanism attaches to the vertical surface without the angle. The size of the openings 80a-80d can be chosen based on the size of the nail or pin to be used and the weight of the object to be hung. Alternatively, adhesive may be used to couple the hanger to the vertical surface, either singularly placed or covering the full back face 30b of the plate 30.

The hanger 30 further includes a marking hole 50 traversing from the front face 30a and the back face 30b of the plate 30, though which a mark may be made onto the vertical surface to indicate a desired placement of the hanger on the vertical surface. In an exemplary embodiment, the hole 50 is positioned approximately midway between the left and right edges of the plate 30 and offset from the top edge of the plate 30.

To hang the object, a user places the hanger on the vertical surface by abutting the back side 30b of plate 30 to the vertical surface. The user positions the plate 30 on the vertical surface where the user wishes the object to hang or simply marks the desired spot on the vertical surface where the object is preferred within its surroundings. The user marks the position by making a mark on the vertical surface through the marking hole 50 using a writing instrument. This allows the user to remove the plate 30 and/or later return the plate 30 to the desired location. The plate 30 is then rotated until the bubble-level 10 indicates that the hooks 40a-40b are level with each other. Pins, nails, screws, or other attachment mechanisms are placed through the openings 80a-80d in the wall contacts 20a-20d and attached to the vertical surface, thus coupling the hanger to the vertical surface. The user may choose to use less than all of the wall contacts 20a-20d. A wire attached to the object is placed within the hooks 40a-40b.

In accordance with the exemplary embodiments, the hanger of the present invention is composed from a single part for ease of use and manufacturing efficiency. The hanger does not require the object to be hung to have a specifically shaped counterpart in order to interface with the hanger. The hanger further eliminates the need for additional parts to be attached to the object for practically-needed extra support. The hanger provides great flexibility with respect to the object to be hung, the material make-up of the object to be hung, and the type of attachment mechanism of such object, while preserving the ability to move the object in any direction after hanging in order to reconcile any optical variant that would cause the otherwise level object to better conform to its surroundings. The use of multiple hooks provide more stability, with the object being less susceptible to tilting out of place than one-hook solutions. The object thus requires less frequent repositioning. The hanger removes the need for elaborate and/or time-consuming measuring, thus saving the user time and frustration.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A hanger, comprising:
   a plate comprising a front face, a back face opposite the front face, atop edge, and a bottom edge opposite the top edge, the back face to abut a vertical surface onto which an object is to be hung;
   a first hook and a second hook for engaging a hanging mechanism coupled to the object, the first hook and the second hook being integrated with the front face at fixed locations and protruding outward from the front face;
   an integrated bubble level fixably coupled to the front face and positioned more proximate to the bottom edge than the first hook and the second hook, the integrated bubble level calibrated to indicate a horizontal orientation of the first hook, relative to the second hook; and
   a plurality of wall contacts protruding outward from the front face, wherein each wall contact comprises an opening through which an attachment mechanism traverses to attach the plate to the vertical surface, wherein the plurality of wall contacts comprises:
   a first set of wall contacts residing between a first side edge of the plate and a first hook; and
   a second set of wall contacts residing between a second side edge of the plate opposite the first side edge and the second hook, wherein each of the plurality of wall contacts comprises an angled outer surface and a hole in the angled outer surface.

2. The hanger of claim 1, further comprising an adhesive compound on the back face of the plate.

3. The hanger of claim 1, wherein further comprising a marking hole traversing from the front face and the back face of the plate, positioned between a first side edge of the plate and a second side edge of the plate opposite the first side edge, and offset from a top edge of the plate.

4. The hanger of claim 1, wherein further comprising an opening in the plate, wherein the bubble level resides within the opening and is fixably coupled to the front face.

5. The hanger of claim 1, wherein the first hook and the second hook each comprises material cut from the plate and manipulated into a hook shape.

6. A method for hanging an object on a vertical surface, comprising:
   (a) placing a hanger on the vertical surface, the hanger comprising:
      a plate comprising a front face, a back face opposite the front face, a top edge, and a bottom edge opposite the top edge, wherein the back face abuts the vertical surface;
      a first hook and a second hook protruding outward from the front face;
      an integrated bubble level fixably coupled to, the front face and positioned more proximate to the bottom edge than the first hook and the second hook, the integrated bubble level calibrated to indicate a horizontal orientation of the first hook relative to the second hook; and
      a plurality of wall contacts protruding outward from the front face, wherein the plurality of wall contacts comprises: a first set of wall contacts residing between a first side edge of the plate and a first hook; and a second set of wall contacts residing between a second side edge of the plate opposite the first side edge and the second hook, wherein each of the plurality of wall contacts comprises an angled outer surface and a hole in the angled outer surface;
   (b) positioning the hanger on a desired location on the vertical surface;
   (c) without engaging a hanging mechanism coupled to the object, rotating the hanger until the integrated bubble level indicates that the first hook is level relative to the second hook;
   (d) attaching the hanger to the vertical surface by placing one or more plate attachment mechanisms through one or more of the plurality of wall contacts and coupling the one or more plate attachment mechanisms to the vertical surface; and
   (e) placing the hanging mechanism coupled to the object within the first hook and the second hook.

7. The method of claim 6, wherein the placing (e) comprises:

(e1) placing the hanging mechanism coupled to the object within the first hook and the second hook without detaching the hanger from the vertical surface.

8. The method of claim 6, wherein the hanging mechanism comprises a wire, wherein the placing (e) comprises:
   (e1) placing the wire coupled to the object within the first hook and the second hook.

9. The method of claim 6, wherein the first hook and the second hook are integrated with the front face at fixed locations.

10. The method of claim 6, wherein the hanger further comprises a marking hole traversing from the front face and the back face of the plate, positioned between a first side edge of the plate and a second side edge of the plate opposite the first side edge, and offset from a top edge of the plate, wherein the positioning (b) comprises:
   (b1) applying a mark onto the vertical surface through the marking hole;
   (b2) removing the hanger from the vertical surface; and
   (b3) repositioning the hanger onto the vertical surface on the desired location using the applied mark.

11. The hanger of claim 1, wherein when the first hook and the second hook engage the hanging mechanism, the integrated bubble level is not visible.

12. The method of claim 6, wherein the bubble level is not visible when the hanging mechanism is placed within the first hook and the second hook.

\* \* \* \* \*